United States Patent [19]

Petersen

[11] Patent Number: 4,489,248
[45] Date of Patent: Dec. 18, 1984

[54] LINEAR ACTUATOR

[75] Inventor: David A. Petersen, Austin, Tex.

[73] Assignee: Victory Enterprises Technology, Inc., Austin, Tex.

[21] Appl. No.: 516,553

[22] Filed: Jul. 25, 1983

[51] Int. Cl.³ .............................................. H02K 7/10
[52] U.S. Cl. ...................................... 310/76; 310/80; 310/83
[58] Field of Search ...................... 310/76, 77, 78, 80, 310/83

[56] References Cited

U.S. PATENT DOCUMENTS

| | | | |
|---|---|---|---|
| 3,264,502 | 8/1966 | Lytle et al. | 310/78 X |
| 3,278,774 | 10/1966 | Roller et al. | 310/80 X |
| 3,777,587 | 12/1973 | Hoshina et al. | 310/80 X |
| 3,824,420 | 7/1974 | Stegeman et al. | 310/80 X |
| 4,066,922 | 1/1978 | Henneman et al. | 360/83 X |

Primary Examiner—Donovan F. Duggan
Attorney, Agent, or Firm—Arnold, White & Durkee

[57] ABSTRACT

A linear actuator is disclosed which includes a frame, a first lead screw mounted to the frame and adapted for rotation, and a second lead screw mounted to the frame parallel to the first lead screw and adapted for rotation. An actuator block is movably secured to the first and second lead screws and includes an actuator assembly for selectively engaging the first lead screw to move the block in the first direction and an actuator assembly for selectively engaging the second lead screw to move the block in an opposing second direction.

12 Claims, 4 Drawing Figures

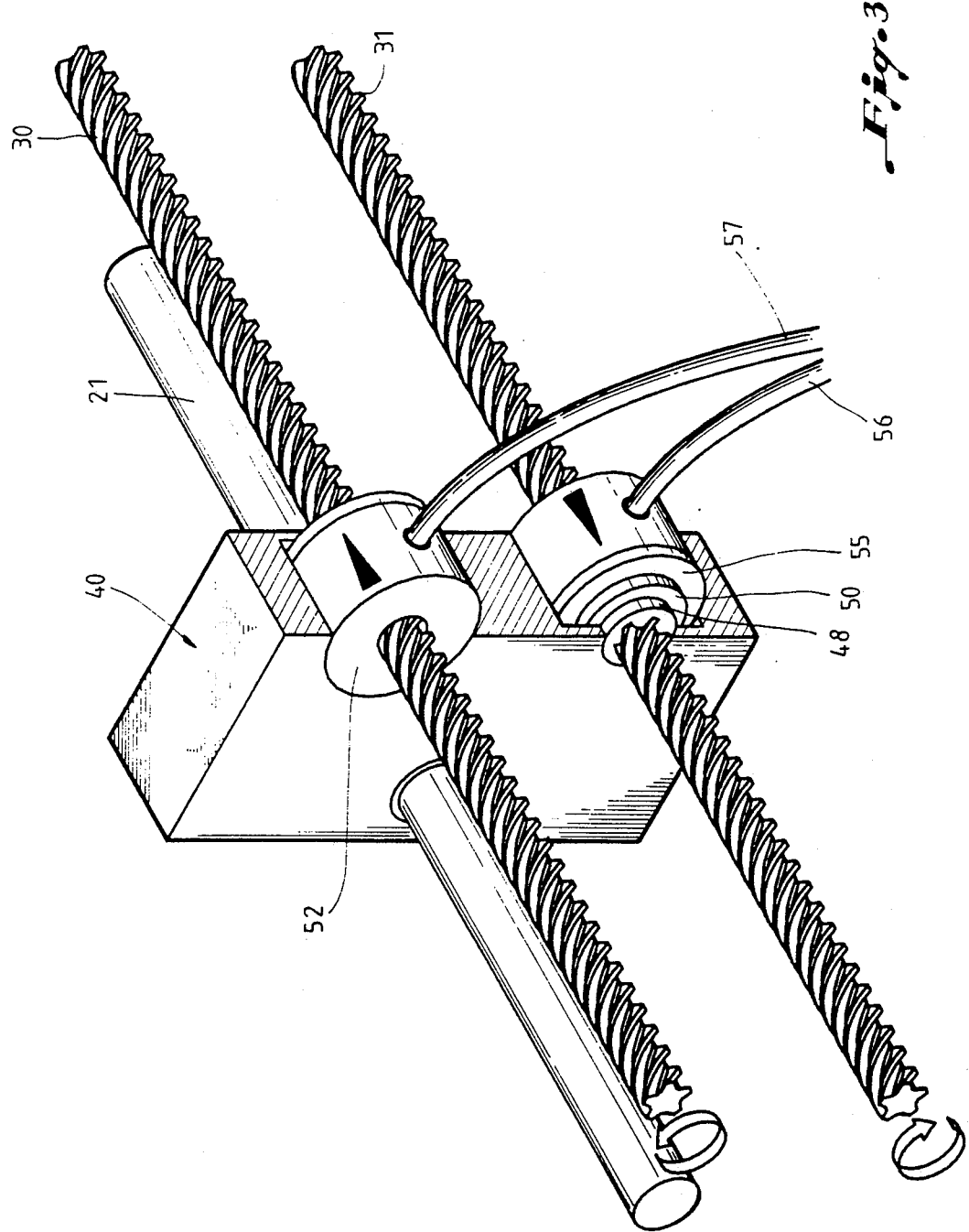

LINEAR ACTUATOR

BACKGROUND OF THE INVENTION

The present invention relates to linear actuators, and more particularly, it relates to a linear actuator capable of performing a plurality of simultaneous, independent functions.

There exists a variety of linear actuators which perform differing individual functions. For example, linear actuators are currently used to provide reciprocating motion across a page for the typewriter ball on many of the current typewriters. Linear actuators may also be used to draw wires or cables connected to mechanical apparatus to perform a variety of functions.

Many of the linear actuators today, however, are believed to be limited in capability for some applications. For example, if capability of linear motion in more than one direction is desired, it is believed that some linear actuators require a reversal in the power mechanism to accommodate changes in direction. Similarly, if it is desired to perform a plurality of independent, but simultaneous operations involving movement in different directions, then a corresponding plurality of linear actuators are believed to be required.

It would therefore be advantageous to provide a single linear actuator which can accommodate the performance of a plurality of independent, but simultaneous functions.

SUMMARY OF THE INVENTION

Accordingly, a linear actuator is provided which is capable of accommodating the performance of a plurality of functions independently, yet simultaneously. The linear actuator includes a frame adapted to rotatably support a pair of lead screws. (The use of "lead" herein refers to a directional "lead" rather than to the metal "lead"). The lead screws are adapted to be rotated in opposing directions, i.e., the first lead screw may rotate in clockwise direction, while a second lead screw rotates counterclockwise. The linear actuator further includes an actuator block movably secured to the first and second lead screws, wherein the actuator block includes a means for selectively engaging the first lead screw to move the block in a first direction and a means for selectively engaging the second lead screw to move the block in an opposing second direction.

In a preferred embodiment of the present invention, the linear actuator further comprises a power means for continuously rotating the first and second lead screws in selected directions.

In a still more preferred embodiment of the present invention, the linear actuator comprises a plurality of actuator blocks movably secured to the lead screws.

In the most preferred embodiment of the present invention, the first and second lead screws each comprise high helix angle threads disposed along its length.

The means for selectively engaging the first lead screw and the second lead screw may take a variety of forms within the spirit and scope of the present invention. In a preferred embodiment of the present invention, each of the selective engagement means includes a rotating member mounted in the actuator block in threaded relationship with the lead screw. The rotating member is mounted for free rotation relative to the actuator block in response to the rotation of the lead screw. A braking member is secured to the actuator block and adapted to provide selective movement of the braking member to engage and substantially stop rotation of the rotating member. The braking member is further secured to the actuator block to prevent rotation of the braking member relative to the actuator block upon engagement of the braking member with the rotating member.

In a more preferred embodiment of the present invention, the rotating member includes a nut mounted in the actuator block in threaded relationship with the lead screw. The nut includes a collar extending radially outwardly therefrom to transmit the thrust from the lead screw to the actuator block when selectively engaged. The rotating member further includes a brake disc secured to the nut such that linear movement of the disc along the nut is accommodated while rotation of the disc relative to the nut is substantially precluded. The braking member includes an opposing high friction brake pad associated with an electromagnetic coil secured to the actuator block, wherein the coil is adapted to provide linear movement of the brake disc to engage the high friction brake pad to stop the relative rotation of the disc.

Hence, upon the selective engagement of the braking member with the rotating member, the free rotation of the threaded rotating member will be stopped, causing the actuator block to move linearly along the respective lead screw. In turn, the high helix configuration facilitates the movement of the non-engaged rotating nut along its corresponding lead screw as it is carried by the actuator block. The provision of a pair of lead screws rotating in opposite directions, thereby accommodates the movement of the actuator block in opposite directions in response to the selective engagement of each of the screws.

Similarly, the provision of a plurality of actuator blocks, each with an independently operable selective engagement means for each lead screw, accommodates the performance of a plurality of simultaneous, independent functions by each block in either direction. The present invention thereby provides a linear actuator which is versatile enough to perform a plurality of independent functions simultaneously.

BRIEF DESCRIPTION OF THE DRAWINGS

The invention will be further illustrated by reference to the appended drawings which illustrate a particular embodiment of a linear actuator in accordance with the present invention.

FIG. 3 is a partial, cut-away sectional view of the device shown in FIG. 1.

DETAILED DESCRIPTION OF THE PREFERRED EMBODIMENT

Figure 1:
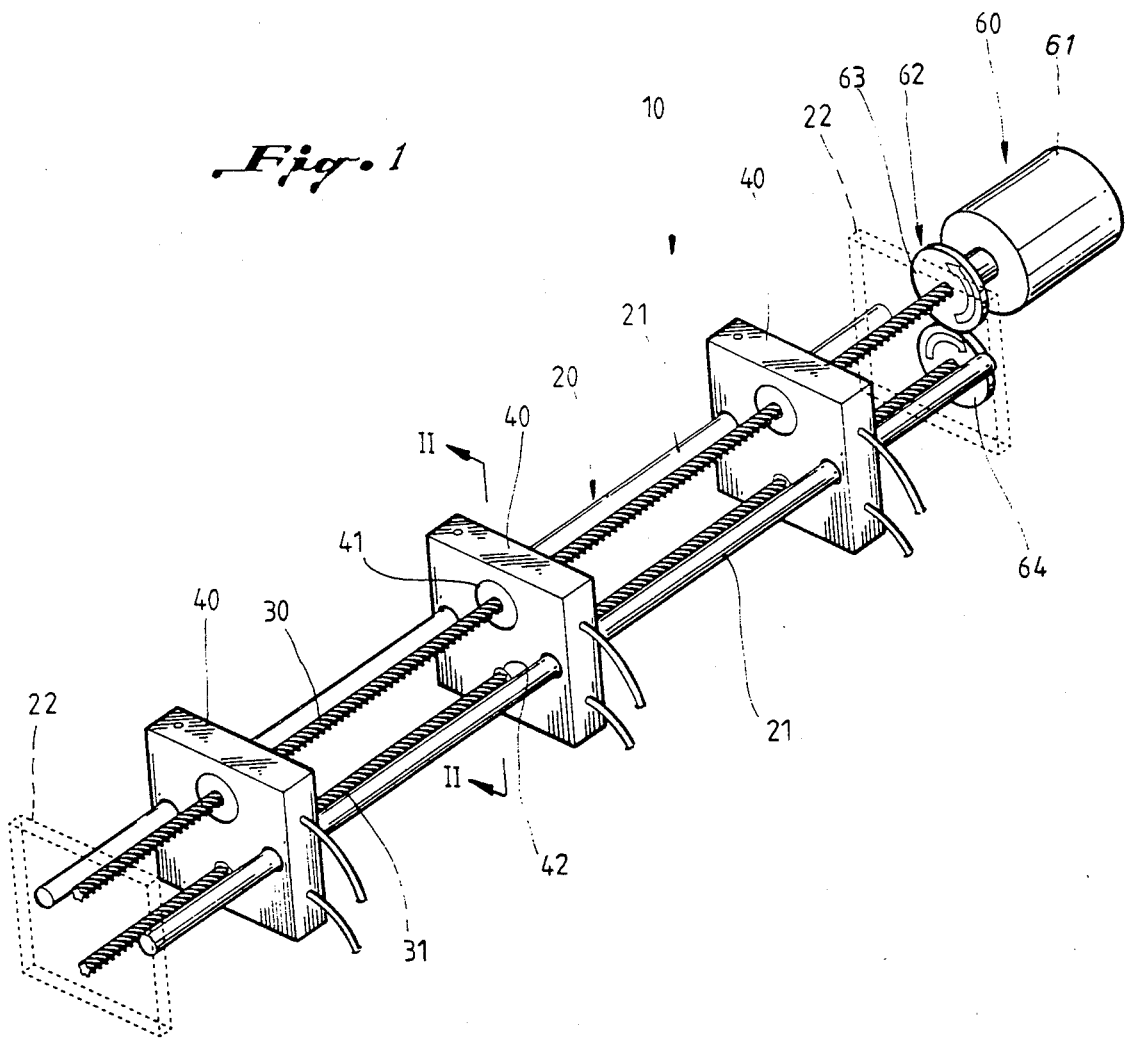
FIG. 1 is a perspective view of an embodiment of the linear actuator in accordance with the present invention.

The preferred embodiment of the linear actuator 10 is generally represented by a frame 20 to which are mounted a pair of lead screws 30 and 31, an actuator block 40 movably secured to the lead screws 30, 31 and frame 20, and a power means 60 for continuously rotating the first and second lead screws in predetermined directions.

Referring to FIG. 1, the frame 20 may comprise any of a number of configurations of support members suitable for providing support for the lead screws 30 and 31, the actuator block 40, and the power means 60. In the preferred embodiment, the frame 20 includes a pair of opposing parallel guide rods 21 which are secured in a regular spaced relationship to opposing end supports 22 (shown ghosted schematically). In the preferred embodiment, the guide rods 21 include elongated cylindrical members.

The end supports 22, which will typically be integrated into the apparatus with which the linear actuator is utilized, may comprise any of a number of suitable reconfigurations. In the preferred embodiment, the end supports 22 are shown schematically as rectangular plates disposed perpendicularly to the axes of the guide rods 21 and perpendicular to the axes of the lead screws 30 and 31.

Referring still to FIG. 1, the linear actuator 10 further includes a first lead screw 30 disposed parallel to the guide rods 21 and rotatably mounted to the frame 20, and a second lead screw 31 disposed parallel to the first lead screw 30 and rotatably mounted to the frame 20. In the preferred embodiment, the first and second lead screws 30, 31 are comprised of elongated threaded members having high helix angle threads. The lead screws 30 and 31 are supported at either end in the end supports 22 by thrust bearings (not shown) in a manner permitting their free rotation.

The direction of rotation of the lead screws 30 and 31 is dependent on the "hand" of the threads. If both lead screws are of the same "hand" (e.g. both right hand helix), they must rotate in opposite directions to accommodate the selective movement of the actuator block 40 in either direction. Similarly, if the lead screws are of opposite "hands", they must rotate in the same direction.

Additionally, it has been found that the use of high helix angle threads for the lead screws 30 and 31 is necessary for easy movement of the actuator blocks 40 along the screws. In the preferred embodiment, the threads comprise a helix angle of 45°±15°.

Figure 2:
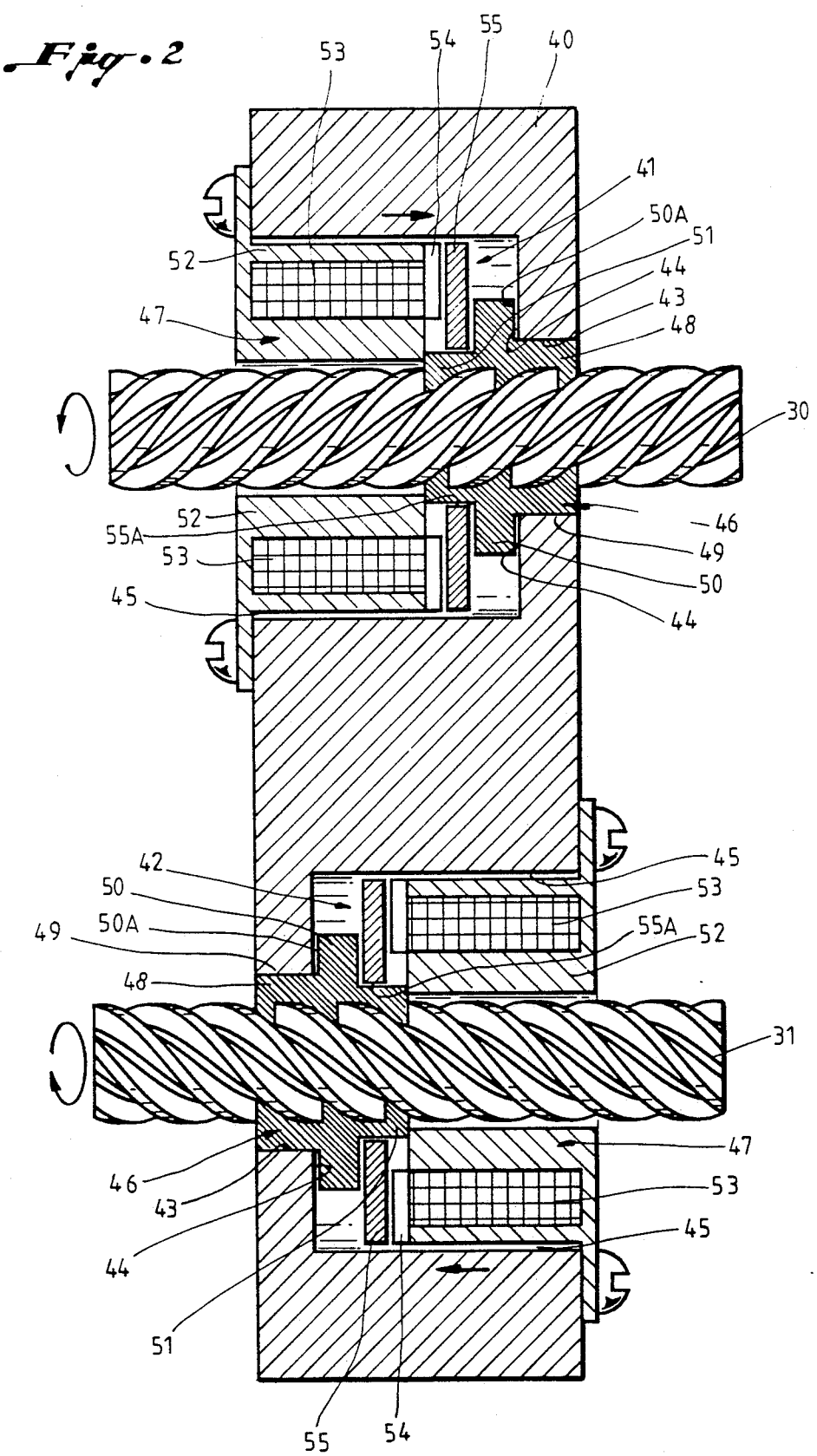
FIG. 2 is a sectional view of the actuator block shown in FIG. 1, taking along the line II—II of FIG. 1.
Figure 4:
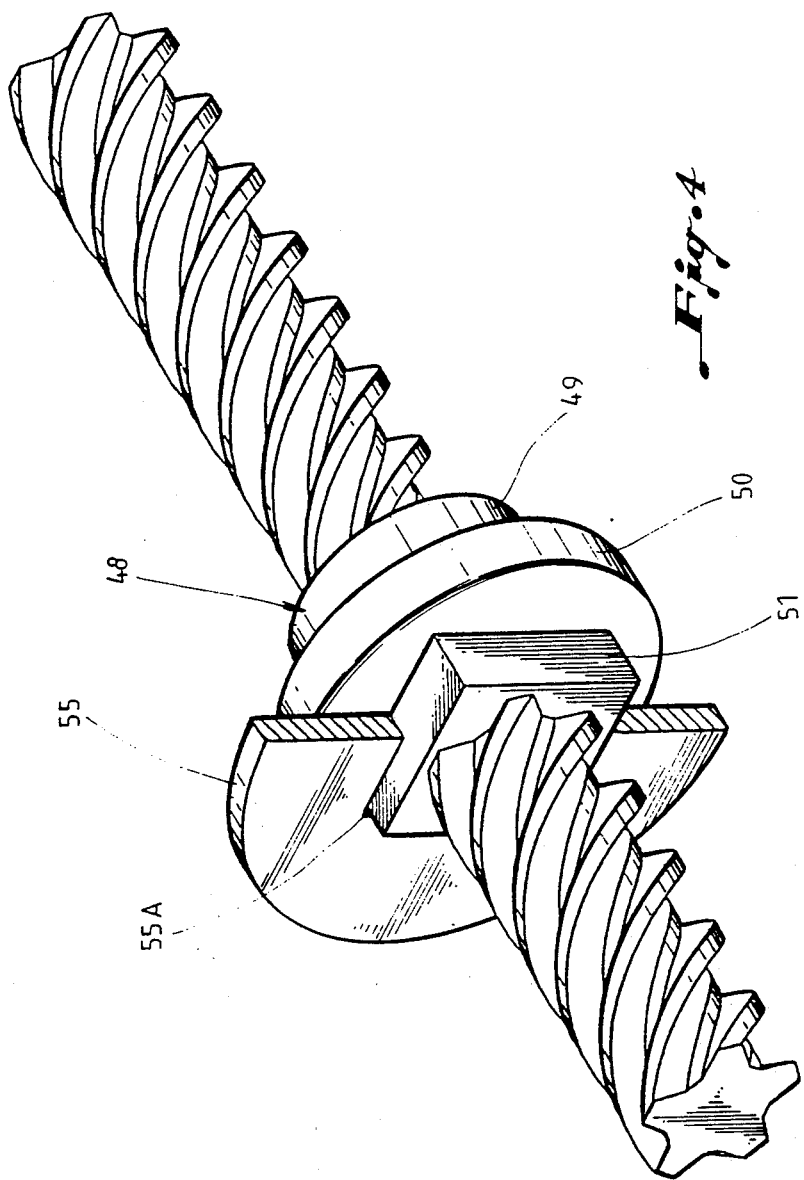
FIG. 4 is a perspective view of the elongated nut of the present invention illustrating the steel brake disc mounted onto the hub of the nut.

Referring now to FIGS. 1-3, the actuator blocks 40 are movably secured to the lead screws 30 and 31 for selective movement along a determined length of the screws 30 and 31. Each of the actuator blocks 40, in the preferred embodiment, includes a first bore 41 passing therethrough, the bore 41 being concentrically aligned with the lead screw 30, and a second bore 42 passing therethrough, the second bore 42 being concentrically aligned with the lead screws 31. The bore 41 and bore 42 each have two concentrical cylindrical sections of differing diameters. In particular, each bore includes a first bearing section 43 of selected diameter and a brake housing section 45 of diameter greater than the diameter of the bearing section 43 such that an annular thrust shoulder 44 is formed at the intersection of the two sections. The particular orientation of the two sections is dependent upon the "hand" of the threads and the direction of rotation of the respective lead screw, as will be discussed below.

The actuator blocks 40 further include a rotating member 46 mounted within each of the bores 41 and 42 of the actuator block 40 in threaded relationship with the respective lead screw 30 or 31. The rotating member 46 is mounted for free relative rotation within the actuator block 40 and responds to the rotation of the respective lead screw 30 or 31. The rotating member 46 is further mounted such that linear movement of the member 46 relative to the actuator block 40 is substantially precluded. The actuator block 40 also includes a braking member 47 secured to the actuator block 40 and adapted to selectively engage and substantially stop rotation of the rotating member 46. It should be noted that the braking member 47 is preferably secured to the actuator block 40 to prevent rotation of the braking member 47 relatively to the actuator block 40 upon engagement with the rotataing member 46.

In the preferred embodiment, the rotating member 46 includes an elongated threaded nut 48 having inner threads complementary to the outer threads of the respective lead screws 30 and 31. The nut 48 includes a first bearing section 49 having an outer bearing surface of diameter slightly less than the diameter of the bearing section 43 of the bores 41 and 42 such that the first section 49 of the nut 48 seats within the bearing section 43 to rotate freely with a minimum of play between the two bearing surfaces.

The nut 48 further includes an outwardly extending collar 50 disposed on the nut 48 such that the collar 50 rotates freely within the brake housing 45 when the nut 48 is seated in place. The collar 50 includes an annular shoulder 50A adapted for engaging with the annular thrust shoulder 44 to push the actuator block 40 when the rotating member 46 is engaged by the braking member 47.

Accordingly, it should be understood that the orientation of the thrust shoulder 44 as formed by the bearing section 43 and brake housing section 45 in each bore, is dependent upon the "hand" of the respective lead screw and the direction of rotation of the respective lead screw. In particular, the thrust shoulder 44 must be disposed such that the rotatation of the lead screw within the respective bore forces the shoulder 50A of the nut 48 against the shoulder 44 when the nut 48 is engaged.

The nut 48 also includes a hub 51 disposed at the opposite end of the nut 48 from the first bearing section 49. In the preferred embodiment, the hub 51 has an elongated configuration which is substantially square in cross-section.

Referring still to FIG. 2, the braking member 47 includes a coil housing 52 adapted to be secured within the brake housing 45 of the bore 41. The coil housing 52 extends a selected distance within the brake housing 45 and includes an electromagnetic coil 53 mounted therein. The coil 53 includes a high friction surface 54 mounted at the inner end of the coil housing 52 in the brake housing 45.

In the preferred embodiment, the high friction surface 54 comprises an annular member mounted to the inner end of the coil housing 52. The annular friction surface 54 extends toward the hub 51 such that the hub 51 resides within the bore of the annular friction surface 54.

The braking member 47 also includes a steel brake disc 55 slidably mounted on the hub 51 for selective linear movement along the hub 51. The brake disc 55 has a center aperture 55A having a configuration complementary to the outer configuration of the hub 51 such that relative rotation of the disc 55 is substantially precluded once the disc 55 is disposed on the hub 51. In the preferred embodiment, the center aperture 55A has a square configuration of dimension slightly greater than the outer dimension of the hub 51 in order to accommodate linear movement of the disc 55 along the hub 51, while precluding relative rotation.

Accordingly, the actuation of the coil 53 attracts the brake disc 55 against the high friction pad 54 to halt the rotation of the rotating member 46 relatively to the actuator block 40. The selective actuation of the coil 53 thereby engages the actuator block 40 with the respective lead screw to cause the actuator block 40 to move along the lead screw in the direction dictated by the threads on the screw. When this action occurs the rotating member 46 engaged to the outer lead screw is moved with the actuator block 40 by means of its collar 50 bearing on the respective thrust surface 44.

In the preferred embodiment, electromagnetic coils 53 are utilized to engage the braking member 47 with the rotating members 46. The power to the coils 53 is selectively provided by wires 56 and 57. In the preferred embodiment, the power to each pair of coils 53 is further interlocked by a suitable interlocking circuit to prevent simultaneous actuation of the coils. It will be appreciated that other means of selectively engaging the braking member 47 with the rotating member 46 to engage the actuating block 40 with a particular lead screw 30, 31 may be utilized in accordance with the present invention.

The power means 60 may include any of a variety of commercially available motors 61 capable of rotating the lead screws 30 and 31 at a desired speed and at a desired level of torque. The power means 60 also includes a linkage 62 between the first lead screw 30 and the second lead screw 31 adapted to rotate the two lead screws in selected directions and at selected speeds. In the preferred embodiment, the first lead screw 30 is attached directly to the output shaft of the motor 61. A gear 63 is also secured to the output shaft of the motor 61 and disposed to mesh with a gear 64 secured to the end of the lead screw 31 whereby the lead screw 30 and the lead screw 31 are the in a one-to-one geared relationship for opposing rotation. It will be understood, however, that other geared relationships and other means of interconnecting the two lead screws such as pulleys and belts may be utilized in accordance with the present invention.

The instant invention has been disclosed in connection with a specific embodiment. However it will be apparent to those of skill in the art that variations to the illustrated embodiment may be undertaken without departing from the spirit and scope of the invention. For example, two pairs of lead screws, each pair rotating at different speeds, could be utilized to provide versatility in speed as well as in direction. Also a variety of stops for the respective actuator blocks 40 could be incorporated, including computerized electronic stops programmed in association with the electromagnetic coils, to prevent the actuator blocks from running into each other. These and other variations will be apparent to those skilled in the art in view of the above disclosure and are within the spirit and scope of the present invention.

What is claimed is:

1. A linear actuator, comprising:
   a frame;
   a first lead screw operationally mounted to the frame and adapted for rotation, the first lead screw comprising high helix angle threads;
   a second lead screw operationally mounted to the frame parallel to the first lead screw and adapted for rotation, the second lead screw comprising high helix angle threads; and
   an actuator block secured to the first and second lead screws, including
      means for selectively engaging the first lead screw to move the block in a first direction; and
      means for selectively engaging the second lead screw to move the block in an opposing second direction;
   wherein said means for selectively engaging the first lead screw and said means for selectively engaging the second lead screw each include:
      a rotating member mounted in the actuator block in complementary threaded relationship with the lead screw, the rotating member being mounted for free rotation relative to the actuator block responsive to the rotation of the lead screw; and
      a braking member secured to the actuator block and adapted to selectively engage and substantially stop rotation of said rotating member relative to the actuator block upon engagement with the rotating member.

2. The linear actuator of claim 1, further comprising power means for continuously rotating the first and second lead screws in selected directions.

3. The linear actuator of claim 1, comprising a plurality of said actuator blocks.

4. The linear actuator of claim 1, wherein said threads have a helix angle of 45°±15°.

5. The linear actuator of claim 1 wherein said rotating member includes a nut rotatably mounted in the actuator block in complementary threaded relationship with the lead screw, the nut including a means for propelling the actuator block when selectively engaged, and wherein said braking member includes:
   a disc mounted on the nut such that linear movement of the disc along the nut is accommodated and such that rotation of the disc relative to the nut is substantially precluded; and
   a means secured to the actuator block for selectively engaging the disc to substantially stop rotation of the disc relative to the actuator block.

6. The apparatus of claim 5 wherein said disc is comprised of steel and wherein said disc engaging means comprises an electromagnetic coil secured to the actuator block and a high friction pad secured to the coil such that upon selective actuation of the coil, the disc is attached to the friction pad to substantially cease rotation of the disc.

7. The apparatus of claim 1 further including interlocking means for preventing simultaneous actuation of the braking members of the first and second lead screw engaging means.

8. A linear actuator for providing multiple simultaneous linear movements, comprising:
   (a) driving means including first and second high helix lead screws adapted for rotation;
   (b) a plurality of actuator blocks movably secured to the first and second lead screws, each actuator block including:
      a first rotating member mounted in the actuator block in complementary threaded relationship with the first lead screw, the rotating member being mounted for free rotation relative to the actuator block responsive to the rotation of the first lead screw;
      a first braking member secured to the actuator block and adapted to selectively engage and substantially stop rotation of said first rotating member relative to the actuator block upon engagement with the first rotating member;

a second rotating member mounted in the actuator block in complementary threaded relationship with the second lead screw, the rotating member being mounted for free rotation relative to the actuator block responsive to the rotation of the second lead screw; and a second braking member secured to the actuator block and adapted to selectively engage and substantially stop rotation of said second rotating member relative to the actuator block upon engagement with the second rotating member.

9. The linear actuator of claim 10 wherein said first and second rotating members of each actuator block each includes a nut rotatably mounted in the actuator block in complementary threaded relationship with the respective lead screw, the nut including a means for propelling the actuator block when selectively engaged by a braking member; and wherein the first and second braking members of each autuator block each includes:

a disc mounted on the nut such that linear movement of the disc along the nut is accommodated and such that rotation of the disc relative to the nut is substantially precluded; and a means secured to the actuator block for selectively engaging the disc to substantially stop rotation of the disc relative to the actuator block.

10. The apparatus of claim 9 wherein each said disc is comprised of steel and wherein each said disc engaging means comprises an electromagnetic coil secured to the actuator block and a high friction pad secured to the coil such that upon selective actuation of a coil, the disc is attached to the friction pad to substantially cease rotation of the disc and the nut relative to the respective actuator block.

11. The linear actuator of claim 8, further comprising power means for continuously rotating the first and second lead screws in selected directions.

12. The linear actuator of claim 10 further including interlocking means for preventing simultaneous operation of the first and second braking members of an actuator block.

* * * * *

UNITED STATES PATENT OFFICE
CERTIFICATE OF CORRECTION

Patent No. 4,489,248            Dated December 18, 1984

Inventor(s) David A. Petersen

It is certified that error appears in the above-identified patent and that said Letters Patent are hereby corrected as shown below:

Column 6, line 3 insert --movably-- after the word "block" and before the word "secured".

Signed and Sealed this

Twenty-eighth Day of May 1985

[SEAL]

Attest:

DONALD J. QUIGG

Attesting Officer      Acting Commissioner of Patents and Trademarks